US009504210B2

(12) United States Patent
Ford et al.

(10) Patent No.: US 9,504,210 B2
(45) Date of Patent: Nov. 29, 2016

(54) WATERING DEVICE

(71) Applicants: David Robert Ford, Kansas City, MO (US); Todd Richard Strickland, Olathe, KS (US)

(72) Inventors: David Robert Ford, Kansas City, MO (US); Todd Richard Strickland, Olathe, KS (US)

( * ) Notice: Subject to any disclaimer, the term of this patent is extended or adjusted under 35 U.S.C. 154(b) by 0 days.

(21) Appl. No.: 13/942,813

(22) Filed: Jul. 16, 2013

(65) Prior Publication Data
US 2014/0014735 A1 Jan. 16, 2014

Related U.S. Application Data

(60) Provisional application No. 61/672,086, filed on Jul. 16, 2012.

(51) Int. Cl.
*B05B 1/14* (2006.01)
*A01G 25/02* (2006.01)
*B05B 1/18* (2006.01)
*B05B 15/06* (2006.01)

(52) U.S. Cl.
CPC ............... *A01G 25/02* (2013.01); *B05B 1/185* (2013.01); *B05B 15/066* (2013.01)

(58) Field of Classification Search
CPC ...... B05B 1/185; B05B 15/066; A01G 25/02
USPC ............. 239/565, 4; 285/272, 273, 274
See application file for complete search history.

(56) References Cited

U.S. PATENT DOCUMENTS

| | | | | |
|---|---|---|---|---|
| 3,185,397 A * | 5/1965 | Nelson | .................. | A01M 7/005 239/154 |
| 4,162,041 A * | 7/1979 | Hane | ...................... | A01G 25/02 239/266 |
| 4,194,695 A * | 3/1980 | Schopp | ................ | A01G 25/023 239/542 |
| 4,778,111 A * | 10/1988 | Leap | ...................... | B05B 1/3026 239/536 |
| 6,065,693 A * | 5/2000 | Lukas | .................... | A01G 25/02 239/266 |
| 6,209,576 B1 * | 4/2001 | Davis | ...................... | E03B 7/071 137/460 |

OTHER PUBLICATIONS

"Tree I.V. Self-Contained Root Feeders." http://www.treeiv.com/. Accessed Oct. 15, 2013.
"Ross Root Feeder Heavy Duty Model." http://www.amazon.com/Ross-Root-Feeder-Heavy-Model/dp/B00002NC84. Accessed Oct. 15, 2013.
"FAQ Ross(R) Root Feeder." http://www.easygardener.com/index.cfm?fuseaction=category.display&category_ID=161. Accessed Oct. 15, 2013.

(Continued)

*Primary Examiner* — Arthur O Hall
*Assistant Examiner* — Joel Zhou
(74) *Attorney, Agent, or Firm* — Husch Blackwell LLP

(57) ABSTRACT

A watering device comprising an inlet valve operably to be connected into fluid communication with a water source, a primary manifold coupled to and in fluid communication with the inlet valve wherein the primary manifold divides the water flow into at least two closed channels. The watering device further includes at least two flexible tubing portions wherein each of the flexible tubing portions may be connected to and in fluid communication with one of the closed channels. The watering device further includes at least two distribution manifolds wherein each of said distribution manifolds may be connected to and in fluid communication with one of the flexible tubing portions. Each distribution manifold includes a plurality of water orifices to facilitate the flow of water therethrough.

17 Claims, 4 Drawing Sheets

(56) References Cited

OTHER PUBLICATIONS

"1-inch Osmile(TM) Professional Series Soaker Hose." http://gardenersedge.com/osmile-soaker-hose%252c-1/p/VP-OS/. Accessed Oct. 15, 2013.

"Soaker Hose Drip Irrigation Tree Ring." http://gardenersedge.com/Soaker+Hose+Drip+Irrigation+Tree+Ring/p/SR6/. Accessed Oct. 15, 2013.

* cited by examiner

WATERING DEVICE

CROSS-REFERENCE TO RELATED APPLICATIONS

This application claims the benefit of U.S. Provisional Patent Application No. 61/672,086, filed Jul. 16, 2012, the entire disclosure of which is hereby incorporated by reference.

BACKGROUND OF THE INVENTION

Field of the Invention

The present invention is in the field of watering devices for watering trees, shrubs, plants and other vegetation.

Description of Related Art

Open hose, soaker hoses, drip-irrigation rings and bags, hose fed-root feeders and self-contained root feeders are commonly used to water trees, both from ground level and by injecting water past the surface directly to the roots. A user must move open hose and hose fed-root feeders manually multiple times during a treatment to water completely around the circumference of a tree or shrub. These known methods currently used in the art do not provide any way to determine how much water is being or has been applied to the area surrounding the tree.

Soaker hoses are time-consuming to set up and it is not possible to measure how much water is being applied. Self-contained root feeders, drip-irrigation rings and bags are semi-permanent and have a self-contained water supply. In addition, these devices are visually unattractive and time consuming to set up. It is understandable that these methods are inadequate at times due to excessive set up time, lack of flexibility and the inability to determine how much water is being applied. Moreover, these methods may be unattractive and are not desirable in residential or commercial settings when a tree or shrub may need treatment over an extended time period.

Other commercial tree watering devices are known and each of these devices has its own substantial deficiencies. The Soaker Hose Tree Ring manufactured by Osmile® that applies water to the ground surface is merely a loop of a known soaker hose. The Soaker Hose Tree Ring uses a connection manifold that is cumbersome to set up and does not provide any way to monitor or measure the amount of water applied. The self-contained root feeder-watering system, Tree I.V., provided by SayeGrow® is bulky, difficult to set up and is visually unattractive. The self-contained root feeder-watering system is essentially a bucket with a spike in the ground that gradually feeds the soil by gravity and/or capillary action. Each tree is required to have a bucket next to it during treatment which is unsightly, particularly for extended treatments. Further, since each bucket uses only one spike, a user may be required to move the system around the tree for various treatments to ensure uniform watering around the circumference of the tree. Similarly, the garden hose fed tree root spike watering system manufactured by Ross® may only be placed in one location at a time and, therefore, must be moved multiple times around the circumference of the tree to effectuate a watering or nutrient treatment around the entire circumference of a tree or shrub.

In addition, the use of watering devices for trees, shrubs, plants, other vegetation and grass are often critical to their survival especially when freshly planted. Watering devices that are time consuming, unattractive and difficult to monitor water usage deter the user from implementing a watering device and/or from using the device properly.

A watering device that overcomes the numerous problems associated with prior art is sought by homeowners, nurseries, landscapers, gardeners and many others. This application outlines a device which provides a solution to these identified shortcomings in existing tree watering systems.

SUMMARY OF THE INVENTION

The present invention is directed toward a watering device comprising an inlet valve, a primary manifold that splits the water flow, at least two flexible tubing portions connected to and in fluid communication with the primary manifold, and at least two distribution manifolds, each distribution manifold being connected to and in fluid communication with one of the flexible tubing portions. Each distribution manifold includes a plurality of water orifices to facilitate the flow of water therethrough.

The inlet valve may be operably connected to and in fluid communication with a water source. The inlet valve may include an on/off switch and/or a meter that is operable for measuring the amount of water flowing through the inlet valve in either a total volume and/or a flow rate.

The primary manifold is operably connected to and in fluid communication with the inlet valve wherein the primary manifold divides the water flow into at least two closed channels. The primary manifold may be connected to the inlet valve with a twist/pivot connection to allow various orientations of the watering device or to allow the watering device to better conform to the surrounding topography.

The two flexible tubing portions may be operably coupled to one of the closed channels of the primary manifold. The flexible tubing portions may be elastic in that they spring back to a "neutral" position upon being displaced or, alternatively, may be more rigid, but flexible in that a user may be able to flex or change the shape of the tubing portions to a position that will be held until the user changes the flexed shape.

The distribution manifolds may be operably connected to the flexible tubing portions. The distribution manifolds may have a shape, such as arched, semi-circle, straight, "L-shaped", or any other shape. The distribution manifolds may be rigid or flexible. Further, the distribution manifolds may be operably connected to the flexible tubing portions with a twist/pivot connection to allow various orientations of the watering device or to allow the watering device to better conform to the surrounding topography.

Other and further objects of the invention, together with the features of novelty appurtenant thereto, will appear in the course of the following description.

BRIEF DESCRIPTION OF THE SEVERAL VIEWS OF THE DRAWING

The accompanying drawings form a part of the specification and are to be read in conjunction therewith, in which like reference numerals are employed to indicate like or similar parts in the various views, and wherein.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the scope of the present invention. The present invention is defined by the appended claims and, therefore, the description is not to be taken in a limiting sense and shall not limit the scope of equivalents to which such claims are entitled.

Figure 1:
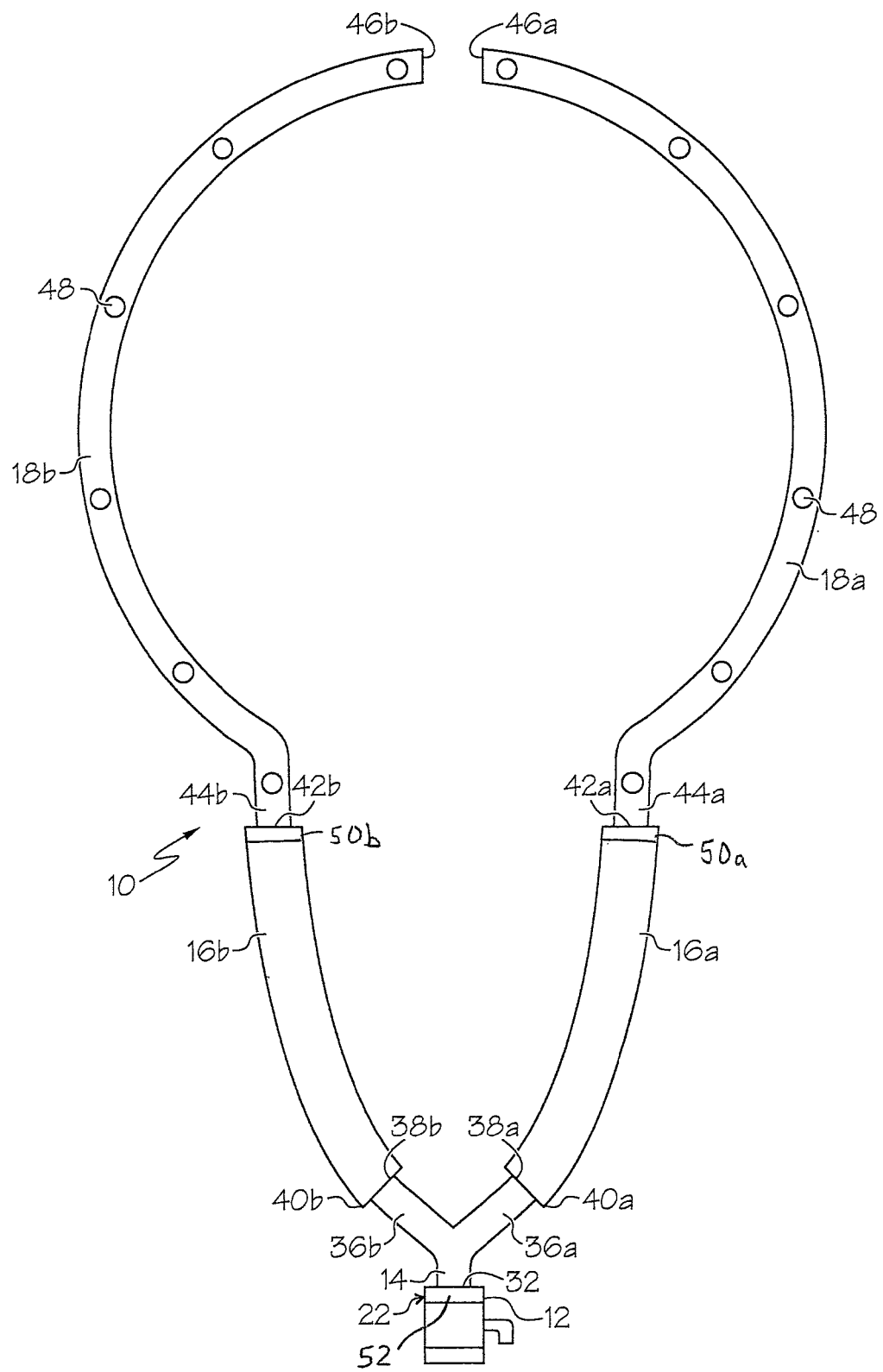
FIG. 1 is a top plan view of one embodiment of the present watering device constructed in accordance with the teachings of the present invention.

As illustrated in FIG. 1, the present invention is directed toward a watering device 10 for trees, shrubs, plants, vegetation, grass or the like that overcomes the problems associated with prior art. This invention saves time, is easy to set up and use, easily monitors water output and is not visually obtrusive. Watering device 10 comprises an inlet valve 12, a primary manifold 14 which divides water flow into at least two directions, at least two flexible tubing portions 16a and 16b, and at least two distribution manifolds 18a and 18b.

Figure 2:
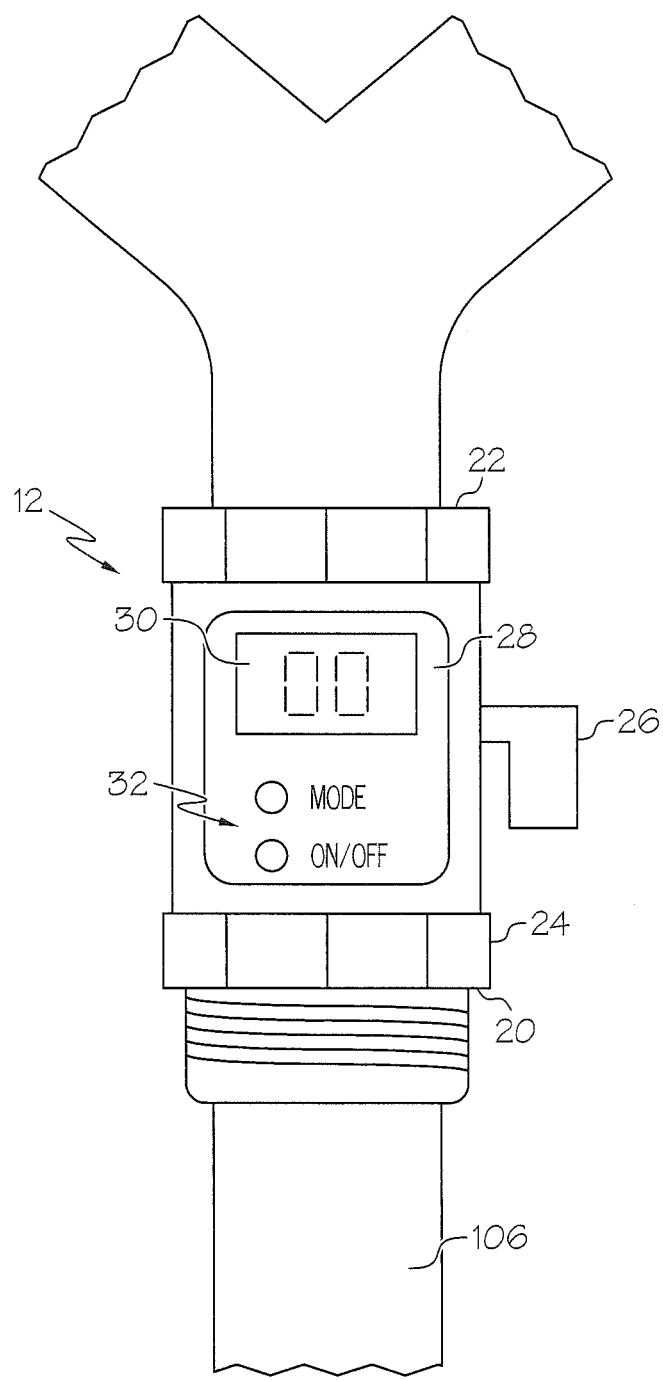
FIG. 2 is a top view of the inlet valve of the embodiment of the present watering device of FIG. 1.

As shown in FIG. 2, inlet valve 12 includes an inlet end 20 and an outlet end 22. Inlet end 20 may have a female standard hose connection 24, or a quick-connect hose connection (not shown) or any other residential or commercial hose connection known in the art to couple watering device 10 to a residential or commercial hose 106. Inlet valve 12 may include an on/off switch or valve 26 or other flow control device now known or hereafter developed in the art. Inlet valve 12 may also include a meter 28 that measures the amount of water running through inlet valve 12 of watering device 10 and it may provide an output display 30 providing the user a visual indication of the volume of water that has flowed through inlet valve 12 during the treatment or the current flow-rate of the water. Inlet valve 12 may also include one or more controls 32 to perform functions such as changing the display mode of display 30 or for turning display 30 on or off. The display mode may be changeable between different indicators such as the total volume of flow for that treatment, the current flow rate, and/or a reset button. Inlet valve 12 may be substantially rigid and be constructed from plastic, polymer, PVC, metal, any other material now known or hereafter developed in the art, or any combination thereof.

Turning back to FIG. 1, primary manifold 14 has an inlet end 32 that is coupled to outlet end 22 of inlet valve 12 and is in fluid communication therewith. Primary manifold 14 receives water or other fluid from inlet valve 12 and divides the flow into at least two closed channels 36a and 36b. Each closed channel 36 includes an outlet 38. As shown, watering device 10 includes an outlet 38a at the end of channel 36a and an outlet 38b at the end of channel 36b. Primary manifold 14 may also be configured to divide the flow into more than two channels 36. Primary manifold 14 may be substantially rigid and be constructed from plastic, polymer, PVC, metal, any other material now known or hereafter developed in the art, or any combination thereof.

FIG. 1 also illustrates flexible tubing sections 16a and 16b respectively having an inlet end 40a and 40b and an outlet end 42a and 42b. Inlet ends 40a and 40b of each flexible tubing section 16a and 16b is coupled to and in fluid communication with outlets 38a and 38b of closed channels 36a and 36b of primary manifold 14 as shown. Flexible tubing sections 16a and 16b may be constructed from rubber, polymer, nylon, plastic, PVC, or any other material now known or hereafter developed for tubing. In one embodiment of flexible tubing sections 16a and 16b are primarily elastic in that they can deform, but return to a "neutral" position. Alternatively, flexible tubing sections 16a and 16b may be configured to be flexed into a shape that may be held indefinitely until a user re-flexes flexible tubing sections 16a and 16b into a different shape.

Distribution manifolds 18a and 18b respectively have a first end 44a and 44b and a second end 46a and 46b. First ends 44a and 44b are coupled to and in fluid communication with outlet ends 42a and 42b of each flexible tubing section 16a and 16b. Second ends 46a and 46b may be closed permanently or temporarily. In one embodiment, second ends 46a and 46b may be temporarily closed by a plug or removable cap. Further, second ends 46a and 46b may incorporate a connection element such that multiple water devices may be connected in series. Distribution manifolds 18a and 18b have a plurality of orifices 48 distributed along its length which allows water to flow out of watering device 10. Water can be seen leaving distribution manifolds 18a and 18b through orifices 48 and, therefore, it is also easy to visually monitor the amount of water being distributed.

Figure 3:
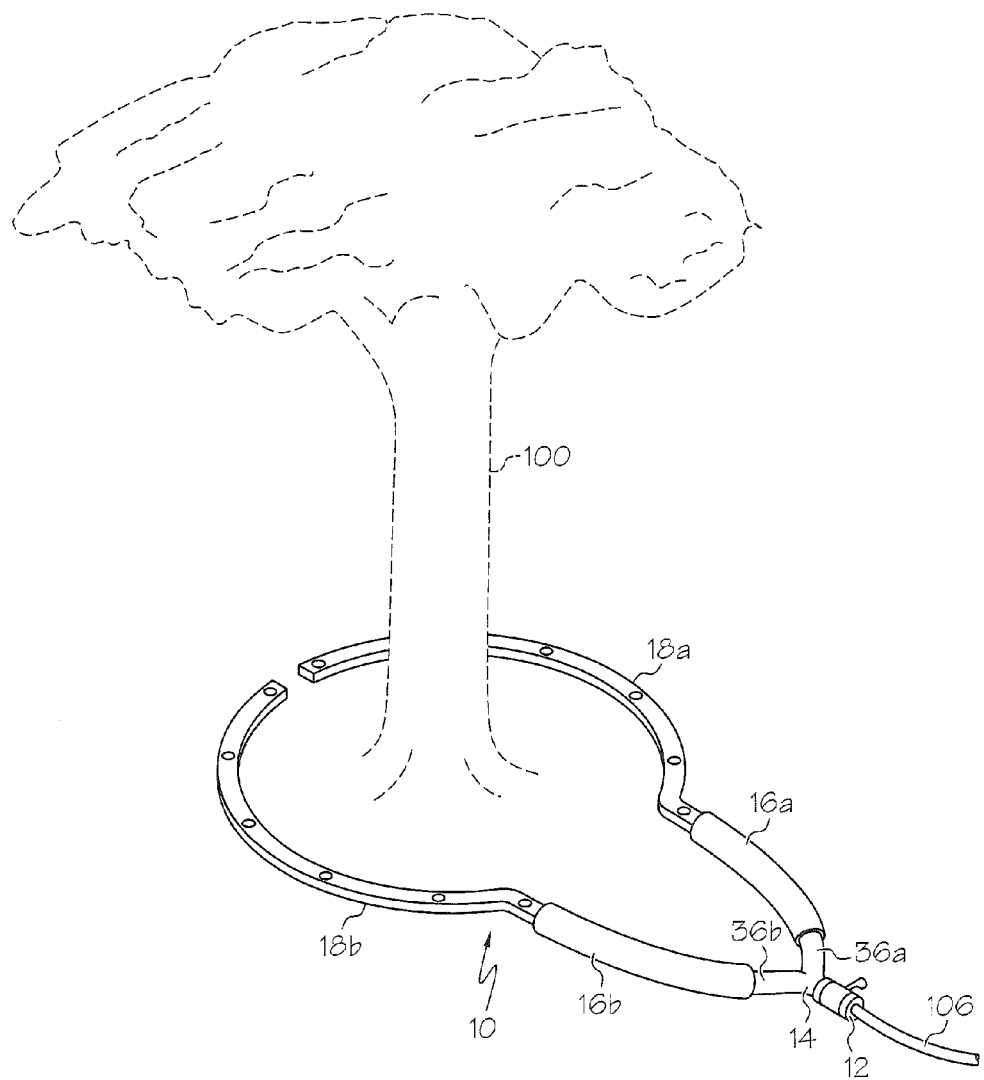
FIG. 3 is a perspective view of the embodiment of the present watering device of FIG. 1 set up to deliver water concentrically around the trunk of a tree.
Figure 4:
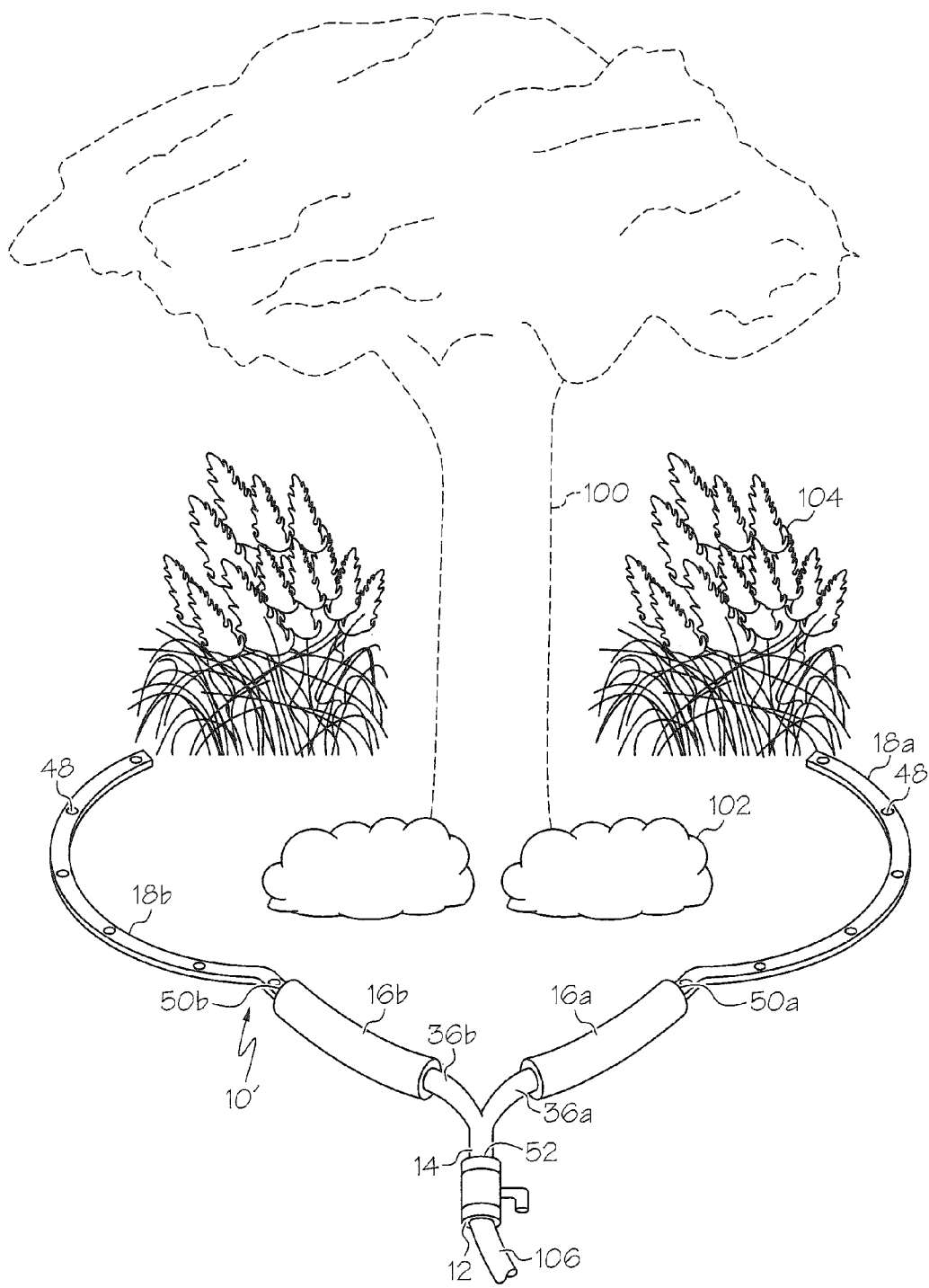
FIG. 4 is a perspective view of another embodiment of the present watering device constructed in accordance with the teachings of the present invention set up to deliver water to a wider area.

As shown in FIGS. 1, 3 and 4, distribution manifolds 18 a and 18 b may have an arched or semi-circular shape to substantially form a circumference around the base of a tree 100 and thereby distribute water to the roots of tree 100. Arched or semi-circular shape may conform to any radius or combination thereof. One embodiment may have a radius in a range between six (6) inches and six (6) feet. This range would allow for the distribution around the entire circumference of tree 100, shrubs 102 or plants 104 with one set-up. Distribution manifolds 18 a and 18 b may also each have a substantially linear shape forming an overall "V" shape. Alternatively, each distribution manifold 18 a and 18 b may have an "L" shape to form a watering device 10 having substantially a diamond shape, or distribution manifolds 18 a and 18 b may be formed in any other desired shape. Another embodiment of the present invention includes distribution manifolds 18 a and 18 b being substantially rigid, but also having some flexibility so that the user may manipulate the shape to form an arch, to substantially linear, or into any multiple curvature shape desired. Distribution manifolds 18 a and 18 b may be substantially rigid and be constructed from plastic, polymer, PVC, metal, any other material now known or hereafter developed in the art, or any combination thereof. Another embodiment of the present invention includes distribution manifolds 18 a and 18 b being flexible and having the ability for a user to manipulate the shape from an arch as shown, to substantially linear, or in any multiple curvature shape desired by the user.

As shown in FIG. 4, an alternative embodiment being watering device 10' is shown to include distribution manifolds 18a and 18b being disposed in a more "spread out" configuration by manipulating flexible tube portions 16a and 16b. This configuration increases the amount of area of water distribution and provides water to tree 100 and also shrubs 102 and plants 104. Watering device 10' of the present invention is distinct in that it may easily conform to the desired area size that requires water by simply adjusting the location of distribution manifolds 18*a* and 18*b* by bending or adjusting the orientation of flexible tube sections 16*a* and 16*b*. However, because distribution manifolds 18*a* and 18*b* are substantially rigid, watering device 10' is still easy to move, carry and/or manipulate. This unique ability may be extremely important to homeowners, nurseries, landscapers, gardeners, and other users.

The embodiment shown FIG. 4 may also include twistable and/or pivot connections 50*a*, 50*b* and 52. These twist/pivot connections allow a user to compensate the shape of watering device 10' when using it on ground that is sloping, undulating, or otherwise uneven. Twist/pivot connections 50*a* and 50*b* may be at the transition point between flexible tube portions 16*a* and 16*b* and distribution manifolds 18*a* and 18*b*. Twist/pivot connections 50*a* and 50*b* may be used to change the orientation of distribution manifolds 18*a* and 18*b* at its intersection with flexible tube portions 16*a* and 16*b* to match the surrounding topography. Twist/pivot connection 52 may be disposed on primary manifold 14 or between the connection between primary manifold 14 and inlet valve 12 and similarly adjustable to compensate for the topography. Twist/pivot connections 50*a*, 50*b*, and 52 may be pivotable in in a single plane or multiple planes and may be twistable up to three-hundred sixty degrees. For example, the twist/pivot connections 50*a*, 50*b*, and/or 52 may be pivotable in one or more axes perpendicular to the direction of water flow and twistable about an axis parallel to the direction of water flow. Any number of twist/pivot connections may be disposed between elements of watering device 10' or along the length of any elements of watering device 10' if additional adjustment capability is desired.

As shown in both FIGS. 3 and 4, inlet valve 12 of watering device 10 and 10' may be coupled to hose 106 and watering device 10 or 10' may lie directly on the ground. This implementation renders watering device 10 or 10' only partially visible from a distance. This allows the user to maintain watering device 10 or 10' in position around tree 100 and or other vegetation, including shrubs 102 and plants 104 without being unsightly. This is desirable for residential and commercial users because watering device 10 or 10' does not have to be moved during events or social gatherings as there is little visual indication that it is disposed around tree 100. Additional benefits of watering device 10 or 10' are that it can also be used to simply water the grass or apply water to any surface in a variety of configurations.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

We claim:

1. A watering device comprising:
    an inlet valve configured to couple said watering device to a water source, said inlet valve having an on position and an off position;
    a primary manifold coupled to and in fluid communication with an outflow end of said inlet valve, said primary manifold divides the water flow into at least a first closed channel and a second closed channel;
    a first continuous tube coupled to and in fluid communication with an outflow end of said first closed channel, said first continuous tube being a first material that is pliable in the temperature range in which water is in a liquid phase, and said first continuous tube having a length sufficient to allow for torsional pliability, wherein said first material is rigidly flexible such that each of said first and second continuous tube sections holds a corresponding shape indefinitely but is easily manipulated into a different shape at the discretion of a user;
    a second continuous tube coupled to and in fluid communication with an outflow end of said second closed channel, said second continuous tube being said first material, and said second continuous tube having a length sufficient to allow for torsional pliability;
    a first distribution manifold coupled directly to and in fluid communication with an outflow end of said first continuous tube, said first distribution manifold being a second material that is substantially rigid in the temperature range in which water is in a liquid phase, and said first distribution manifold including a plurality of water orifices disposed thereon that allow water to flow out of said orifices; and
    a second distribution manifold directly coupled to and in fluid communication with an outflow end of said second continuous tube, said second distribution manifold being said second material, and said second distribution manifold including a plurality of water orifices disposed thereon that allow water to flow out of said orifices;
    wherein a position of said first distribution manifold relative to said primary manifold and a position of said second distribution manifold relative to said primary manifold are independently variable in both a rotational direction and a torsional direction; and
    a twist/pivot connector, wherein said primary manifold is pivotally connected by said twist/pivot connector to said inlet valve, wherein said twist/pivot connector is (i) pivotable in at least one axis that is perpendicular to a flow of water in a direction from said inlet valve to said primary manifold and (ii) twistable about an axis that is parallel to said direction of said flow of water.

2. The watering device of claim 1 wherein said first and said second distribution manifolds have opposing outwardly curved shapes for substantially surrounding a trunk of a tree.

3. The watering device of claim 1 wherein said inlet valve includes a meter to measure the water flowing through said inlet valve.

4. The watering device of claim 3 wherein said meter measures a total volume of water applied.

5. The watering device of claim 3 wherein said meter measures a water flow rate.

6. The watering device of claim 3 wherein said meter includes a display providing a user a visual indication of a measured parameter.

7. The watering device of claim 1, wherein said twist/pivot connector comprises a first twist/pivot connector, wherein said first distribution manifold is pivotally connected by a second twist/pivot connector to said first continuous tube and said second distribution manifold is pivotally connected by a third twist/pivot connector to said second continuous tube.

8. A watering device comprising:
    an inlet valve configured to couple said watering device to a water source, said inlet valve having an on position and an off position;

a primary manifold coupled to and in fluid communication with an outflow end of said inlet valve, said primary manifold divides the water flow into at least a first closed channel and a second closed channel;

a first continuous tube coupled to and in fluid communication with an outflow end of said first closed channel, said first continuous tube being a first material that is pliable in the temperature range in which water is in a liquid phase, and said first continuous tube having a length sufficient to allow for torsional pliability;

a second continuous tube coupled to and in fluid communication with an outflow end of said second closed channel, said second continuous tube being said first material, and said second continuous tube having a length sufficient to allow for torsional pliability;

a first distribution manifold coupled directly to and in fluid communication with an outflow end of said first continuous tube, said first distribution manifold being a second material that is substantially rigid in the temperature range in which water is in a liquid phase, and said first distribution manifold including a plurality of water orifices disposed thereon that allow water to flow out of said orifices; and a second distribution manifold directly coupled to and in fluid communication with an outflow end of said second continuous tube, said second distribution manifold being said second material, and said second distribution manifold including a plurality of water orifices disposed thereon that allow water to flow out of said orifices; and a twist/pivot connector, wherein said first distribution manifold is pivotally connected by said twist/pivot connector to said first continuous tube, wherein said twist/pivot connector comprises a first twist/pivot connector, said watering device further comprising a second twist/pivot connector, wherein said second distribution manifold is pivotally connected by said second twist/pivot connector to said second continuous tube, wherein said first twist/pivot connector is (i) pivotable in at least one axis that is perpendicular to a flow of water in a direction from said first continuous tube to said first distribution manifold, and (ii) twistable about an axis that is parallel to said direction of said flow of water from said first continuous tube to said first distribution manifold, and wherein said second twist/pivot connector is (i) pivotable in at least one axis that is perpendicular to a flow of water in a direction from said second continuous tube to said second distribution manifold, and (ii) twistable about an axis that is parallel to said direction of said flow of water from said second continuous tube to said second distribution manifold.

9. The watering device of claim 8, wherein said first material is rigidly flexible such that each of said first and second continuous tube sections holds a corresponding shape indefinitely but is easily manipulated into a different shape at the discretion of a user.

10. The watering device of claim 9, wherein said second material is at least substantially rigid material and wherein said first and said second distribution manifolds each have opposing outwardly curved shapes for substantially surrounding a trunk of a tree.

11. The watering device of claim 10 wherein said inlet valve includes a meter to measure the water flowing through said inlet valve.

12. The watering device of claim 8 wherein said inlet valve includes a meter to measure the water flowing through said inlet valve.

13. The watering device of claim 8, wherein said primary manifold is pivotally connected by a third twist/pivot connector to said inlet valve.

14. The watering device of claim 13, wherein said third twist/pivot connector is pivotable in at least one axis that is (i) perpendicular to a flow of water through said primary manifold at an outlet end of said primary manifold and (ii) twistable about an axis that is parallel to said flow of water through said primary manifold at said outlet end of said primary manifold.

15. A watering device comprising:

an inlet valve configured to couple said watering device to a water source, said inlet valve having an on position and an off position;

a primary manifold coupled to and in fluid communication with an outflow end of said inlet valve, said primary manifold divides the water flow into at least a first closed channel and a second closed channel;

a first continuous tube coupled to and in fluid communication with an outflow end of said first closed channel, said first continuous tube being a first material that is pliable in the temperature range in which water is in a liquid phase, and said first continuous tube having a length sufficient to allow for torsional pliability;

a second continuous tube coupled to and in fluid communication with an outflow end of said second closed channel, said second continuous tube being said first material, and said second continuous tube having a length sufficient to allow for torsional pliability;

a first distribution manifold coupled directly to and in fluid communication with an outflow end of said first continuous tube, said first distribution manifold being a second material that is substantially rigid in the temperature range in which water is in a liquid phase, and said first distribution manifold including a plurality of water orifices disposed thereon that allow water to flow out of said orifices; and a second distribution manifold directly coupled to and in fluid communication with an outflow end of said second continuous tube, said second distribution manifold being said second material, and said second distribution manifold including a plurality of water orifices disposed thereon that allow water to flow out of said orifices; and a twist/pivot connector, wherein said primary manifold is pivotally connected by said twist/pivot connector to said inlet valve, wherein said twist/pivot connector is (i) pivotable in at least one axis that is perpendicular to a flow of water in a direction from said inlet valve to said primary manifold and (ii) twistable about an axis that is parallel to said direction of said flow of water.

16. The watering device of claim 15, wherein said twist pivot connector comprises a first twist/pivot connector, and wherein said first distribution manifold is pivotally connected by a second twist/pivot connector to said first continuous tube and said second distribution manifold is pivotally connected by a third twist/pivot connector to said second continuous tube.

17. The watering device of claim 15, wherein said first material is rigidly flexible such that each of said first and second continuous tube sections holds a corresponding shape indefinitely but is easily manipulated into a different shape at the discretion of a user.

\* \* \* \* \*